(12) United States Patent
Kretschmer

(10) Patent No.: US 6,536,208 B1
(45) Date of Patent: Mar. 25, 2003

(54) DEVICE FOR SUPPLYING FUEL FOR A ROCKET PROPULSION UNIT AND HEAT EXCHANGER TO BE USED IN SAID DEVICE

(75) Inventor: Joachim Kretschmer, Feldafing (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/890,237

(22) PCT Filed: Jan. 13, 2000

(86) PCT No.: PCT/DE00/00100

§ 371 (c)(1),
(2), (4) Date: Oct. 31, 2001

(87) PCT Pub. No.: WO00/45041

PCT Pub. Date: Aug. 3, 2000

(30) Foreign Application Priority Data

Jan. 29, 1999 (DE) .......................... 199 03 664

(51) Int. Cl.[7] .............................. F02K 9/48; F02K 9/52; F02K 9/64
(52) U.S. Cl. ............................ 60/258; 60/260; 60/267
(58) Field of Search ...................... 60/257, 258, 260, 60/267, 259

(56) References Cited

U.S. PATENT DOCUMENTS

| 3,049,870 A | 8/1962 | Chamberlain | 60/35.3 |
|---|---|---|---|
| 3,242,670 A | * 3/1966 | Buswell | 60/258 |
| 3,516,254 A | * 6/1970 | Hammond | 60/267 |
| 4,583,362 A | 4/1986 | Wagner | 60/259 |
| 4,707,982 A | * 11/1987 | Wagner | 60/258 |
| 5,404,715 A | * 4/1995 | Vuillamy et al. | 60/257 |
| 5,410,874 A | 5/1995 | Limerick | 60/267 |
| 6,052,987 A | * 4/2000 | Dressler | 60/260 |

FOREIGN PATENT DOCUMENTS

GB 845025 8/1960

OTHER PUBLICATIONS

International Search Report for PCT/DE 00/00100 (dated May 16, 2000).

* cited by examiner

Primary Examiner—Ted Kim
(74) Attorney, Agent, or Firm—Crowell & Moring LLP

(57) ABSTRACT

Device for supplying fuel for a rocket propulsion unit has a first and at least a second fuel circuit for respective different fuels. Each fuel is brought to an increased energy level by a pump and is supplied for combustion by way of injection elements. The first fuel is heated in cooling channels extending in a propulsion chamber wall before the fuel is supplied for combustion, and the first fuel is subsequently fed to at least the turbines assigned to the pumps. A heat exchanger is provided in which the fuel coming from the turbines is in a heat exchange with a fuel coming from a pump. A heat exchanger especially usable in the device for supplying fuel is provided.

9 Claims, 3 Drawing Sheets

DEVICE FOR SUPPLYING FUEL FOR A ROCKET PROPULSION UNIT AND HEAT EXCHANGER TO BE USED IN SAID DEVICE

BACKGROUND AND SUMMARY OF THE INVENTION

The invention relates to a device for supplying fuel for a rocket propulsion unit, particularly for a rocket propulsion unit which is based on the combustion of hydrogen and oxygen in the expander circuit, as well as to a heat exchanger to be used in said device for supplying fuel.

For the injection of hydrogen and oxygen into the propulsion chamber of a rocket, the fuel situated in the tanks, for example, hydrogen and oxygen, must be fed at high pressure in a controlled manner. In this case, the hydrogen is first guided by way of control valves into the area outside the propulsion chamber so that, on the one hand, the hydrogen causes a cooling of the combustion chamber wall and, on the other hand, in the case of the expander circuit, because of the heat generated by the combustion events in the combustion chamber, the hydrogen itself is heated for the later expansion in turbines. At a corresponding temperature of the hydrogen, the latter can drive turbines which, in turn, cause the driving of pumps for feeding hydrogen and oxygen to the injection elements at a sufficient pressure. In order to reach a combustion chamber pressure in the rocket propulsion unit which is as high as possible, it is required that devices of this type have a more efficient method of operation.

From the state of the art reflected in U.S. Pat. Nos. 3,049,870; 5,410,874; and 4,583,362 it is known to provide a heat exchanger with a rocket propulsion system, in which the fuel from a turbine exchanges heat with fuel from a pump in order to achieve a further heating of the fuel. However it is problematical with this state of the art in that, in spite of the additional heating, under the circumstances there the desired combustion chamber pressure is not achieved and furthermore the arrangement requires a relatively large space.

It is therefore an object of the invention to provide an optimum arrangement for supplying fuel for a rocket propulsion unit with an expander circuit which, as a whole, operates more efficiently and increases the combustion chamber pressure for rocket propulsion units.

This object is achieved by a device for supplying fuel for a rocket propulsion unit having a first and at least a second fuel circuit, each fuel being brought to an increased energy level by means of a pump and being supplied for combustion by way of injection elements, the first fuel being heated in cooling channels extending in a propulsion chamber wall before the fuel is supplied for combustion, and the first fuel subsequently being fed to at least the turbines assigned to the pumps, characterized in that a heat exchanger is provided in which the fuel coming from the turbines is in a heat exchange with a fuel coming from a pump. Alternative embodiments are described in the claims.

In the following, the invention will be described by means of the attached FIGS. 1 to 3.

DETAILED DESCRIPTION OF THE DRAWINGS

Figure 1:
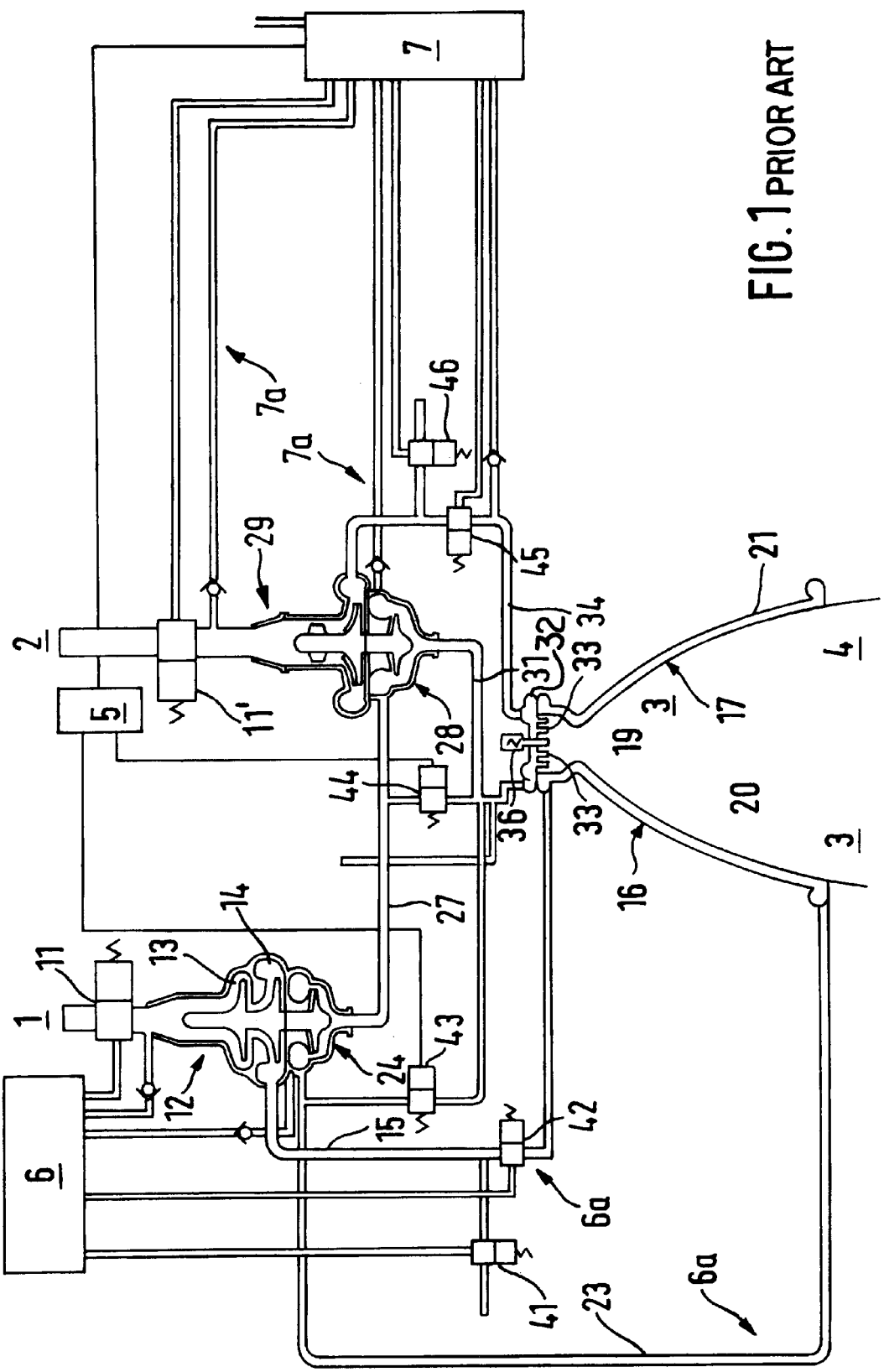
FIG. 1 is a view of a rocket propulsion unit with an expander circuit according to the prior art.

FIG. 1 shows a device for supplying fuel according to the prior art. This device is arranged between a hydrogen tank 1 and an oxygen tank 2 on one side and a propulsion chamber 3 on the other side. The device for supplying fuel is controlled by a central governor 5 which, in turn, by way of corresponding pipes, controls a hydrogen governor 6 for controlling the hydrogen circuit 6a and an oxygen governor 7 for controlling an oxygen circuit 7a. The hydrogen governor 6 controls a tank valve (isolation valve) 11 by means of which the feeding of liquid hydrogen from the hydrogen tank 1 to a hydrogen pump 12 is caused or prevented. In the embodiment according to FIG. 1, the hydrogen pump 12 is constructed as a two-stage pump and therefore comprises a first set of impellers 13 and a second set of impellers 14 in order to pressurize the hydrogen. The hydrogen leaves the hydrogen pump 12 by way of a pipe 15 through which the hydrogen is fed to the cooling channels 16. The cooling channels 16 extend essentially in the axial direction at least in the area of the combustion chamber wall 17 which bounds the combustion space 19 and the first portion of the expansion nozzle 20, as well as partially also in the area of a nozzle extension wall 21. In these areas, the hydrogen is used for cooling the corresponding walls. Simultaneously, the hydrogen is heated. Subsequently, the hydrogen is fed by way of a pipe 23 to the turbine 24 which drives the hydrogen pump 12. By way of a manifold, the hydrogen arrives in the area of a turbine wheel which is connected with the impellers 13, 14 of the hydrogen pump 12. The hydrogen, which, as a result of its heating, is at a raised temperature, thereby drives the turbine 24 and thus the hydrogen pump 12.

The drive of the turbine 24 causes a drop in pressure and temperature in the hydrogen which is supplied by way of a pipe 27 to the turbine 28 of an oxygen pump 29. The turbine 28 drives the oxygen pump 29, whereby oxygen from the oxygen tank 2 is supplied to the oxygen pump when the tank valve (isolation valve 11) assigned to the oxygen pump 29 is open. As a result of the drive of the turbine 28, the hydrogen experiences another pressure and temperature drop and is subsequently supplied by way of a pipe 31 to the injection head 32 with the injection elements 33. On the other hand, the oxygen under pressure by means of the oxygen pump 29 arrives by way of a pipe 34 from the pump 29 also at the injection head 32. The propulsion chamber formed of the injection head 32, the combustion chamber 17 and the nozzle extension 21 extends from the injection head 32. The liquid oxygen and the liquid hydrogen therefore arrive in the combustion chamber on different paths by way of injection elements 33. The hydrogen-oxygen mixture is ignited by an igniter 36 in order to cause the propulsion of the rocket. The controlling of the hydrogen circuit 6a takes place by way of valves 42, 43 which are controlled by the hydrogen governor 6. The oxygen circuit 7a is controlled by way of valves 44, 45 which are partially controlled by the central governor 5 and partially by the oxygen governor 7.

Thus, in the case of the fuel supply device according to the prior art, the hydrogen heated in the propulsion chamber wall 17 and 21 is fed to the turbines 24, 28 for driving the respective pumps 12, 29. Subsequently, the hydrogen arrives directly at the injection head 32 in order to be supplied by it to the combustion in the combustion space 19, 20.

Figure 2:
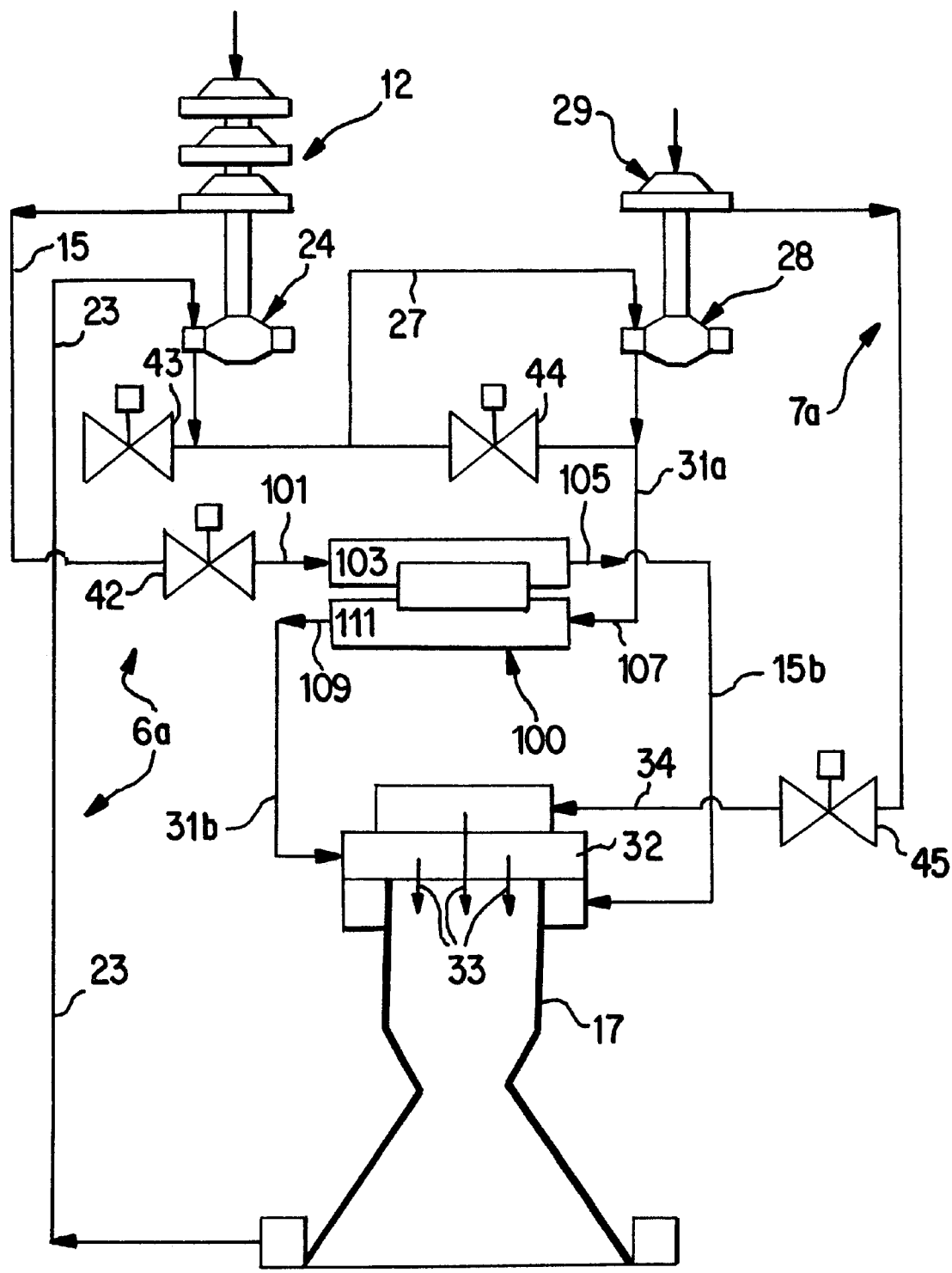
FIG. 2 is a view of the device according to the invention for supplying fuel and having a heat exchanger.

FIG. 2 shows the device for supplying fuel according to the invention. Elements of this representation or components of this device which, with respect to their function, correspond to elements of FIG. 1 or of the prior art illustrated there or are similar to them have the same reference numbers in FIG. 2. The connection of the control valves illustrated in FIG. 2 with the corresponding control unit as well as the control units themselves are illustrated in FIG. 2.

The hydrogen discharged by the hydrogen pump 12 by way of the pipe 15 does not arrive directly in the area of the propulsion chamber wall 17 but is first fed to a heat exchanger 100. For controlling the amount of the hydrogen fed to the latter, the control valve 42 is provided between the hydrogen pump 12 and the heat exchanger 100. The heat exchanger 100 has an inlet pipe 101 for the hydrogen coming from the hydrogen pump 12. After flowing through a first heat exchanger space 103, the hydrogen flows out of the heat exchanger 100 through a first outlet pipe 105. From there, the hydrogen is guided by way of a pipe 15b into the area of the injection head 32, from where it arrives in the cooling channels (not shown) of the combustion chamber wall 17. The cooling channels extend preferably in the axial direction in the combustion chamber wall 17. As a result, on the one hand, the combustion chamber wall 17 is cooled during the combustion events and, on the other hand, the hydrogen is acted upon by a higher temperature in order to drive the turbine 24 of the hydrogen pump 12 and the turbine 28 of the oxygen pump 29. The pump pressures are sufficiently high for overcoming losses of other consuming devices, such as the injection elements 33, the piping or the cooling channels, and finally have a sufficient pressure for the injection operation which, in a predetermined manner, must be greater than the combustion chamber pressure.

From the cooling channels, the hydrogen reaches the turbine 24 by way of the line 23 in order to drive the hydrogen pump 12. From there, the hydrogen arrives by way of a pipe 27 at the turbine 28 of the oxygen pump 29. In contrast to the object illustrated in FIG. 1, the hydrogen does not arrive from the turbine 28 directly at the injection head 32, but by way of a pipe 31a and a second inlet pipe 107 first arrives at the heat exchanger 100. By way of a second outlet pipe 109, the hydrogen exits the heat exchanger 100 and is supplied to the injection head 32 by way of a pipe 31b. After the entry of the hydrogen through the second inlet pipe 107 into the heat exchanger 100, the hydrogen will flow through a second heat exchanger space 111.

In the heat exchanger 100, as a result of a heat transfer, heat is transferred from the hydrogen, which is heated in the cooling channels of the propulsion chamber wall 17 and which arrives in the heat exchanger 100 through the second inlet pipe 107, to the hydrogen which comes from the hydrogen pump 12, flows through the first heat exchanger space 103 and then is to be supplied to the cooling channels. As a result, the hydrogen, which leaves the first heat exchanger space 103 by way of the first outlet pipe 105 and is thereby supplied to the cooling channels, receives a higher temperature than provided in the object according to the prior art illustrated in FIG. 1. Although, as a result, the cooling of the propulsion chamber wall 17 takes place at an operating point which is higher in comparison to the prior art, that is, at a higher temperature of the hydrogen, the required cooling effect can be compensated by means of a corresponding design of the cooling channels. The hydrogen leaves the cooling channels through the pipe 23 and, in this case, has a higher temperature than in the prior art. When flowing through the second heat exchanger space 111, the hydrogen heated in the cooling channels delivers heat to the hydrogen flowing through the first heat exchanger space 103, which hydrogen is then fed to the injection head 32 for the combustion with oxygen.

After exiting from the cooling channels, the hydrogen has a higher temperature than in the prior art. As a result, the energy charged into the turbine 24, 28 becomes higher than in the prior art, so that, with the increase of the pumping capacity of the pumps 12, 29, a higher combustion chamber pressure is reached and the entire rocket propulsion unit will therefore operate with a better specific impetus.

In the case of the object illustrated in FIG. 2, the control valves 42, 43, 44, 45 for the hydrogen circuit 6a and for the oxygen circuit 7a are arranged in a manner similar to that of the prior art. The pipe or valve arrangement can also be implemented in other variants. It is important in this case that the heat exchanger 100 preheats a fuel which, before the injection, is provided for the cooling and for driving the turbines, in order to operate the turbines at a higher energy level.

The heat exchanger 100 can optionally be arranged on the injection head 32 or can be integrated with the latter to a unit or arrangement. This variant is schematically illustrated in FIG. 3.

The cold hydrogen, which, by way of the first inlet pipe 101, arrives in the heat exchanger 100, therefore flows through the first heat exchanger space 103 and leaves the latter by way of the pipe 15b. As illustrated in FIG. 3, the first heat exchanger space 103 may comprise several partial spaces. Thus, the first heat exchanger space 103 may comprise a partial space 141, a partial space 142 and additionally a heat exchange finger 143 or a combination thereof. A connection pipe 147 connects the interior of the first partial space 141 with the interior of the second partial space 142, from where the hydrogen leaves the first heat exchanger space 103 by way of the first outlet pipe 15b.

Figure 3:
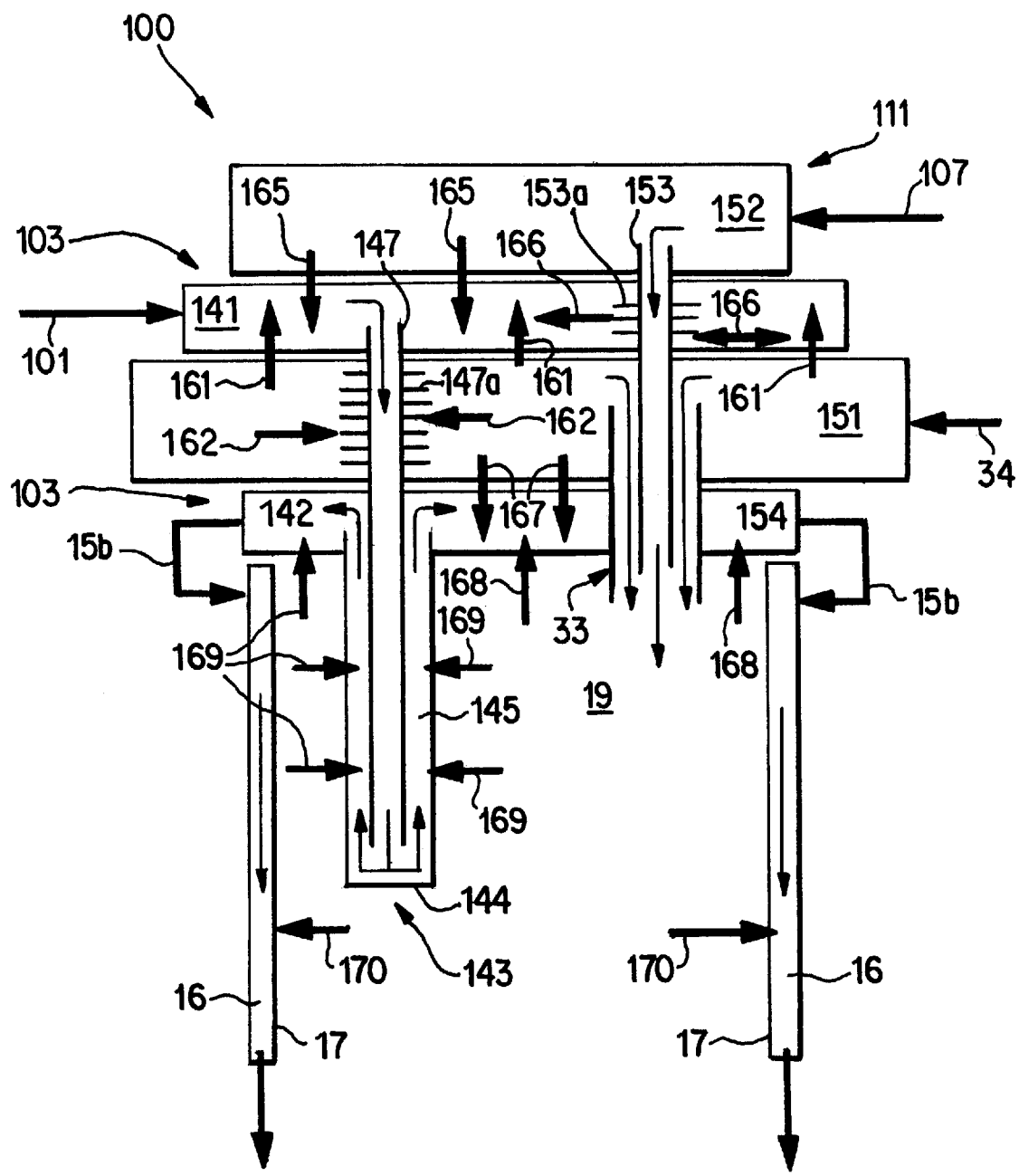
FIG. 3 is a schematic sectional view of the embodiment of the heat exchanger of FIG. 2 according to the invention, in contrast to FIG. 2, the heat exchanger being arranged in the injection head and being integrated with the injection elements of the combustion chamber.

In FIG. 3, an injection element 33 for injecting hydrogen into the combustion chamber 19 is illustrated as an example. For a case in which the heat exchanger 100 is arranged on or in the injection head 32, the heat exchange fingers 143 can be provided. These are preferably arranged such that they project from the second partial space 142 into the combustion chamber 19. In an advantageous further development of the heat exchanger 100, the connection pipe 147 extends through the interior of the second partial space 142 and into the heat exchange finger 143 to close to the closed end 144 of the latter. In the area of the closed end 144, the hydrogen, which is at first guided in the connection pipe 147, leaves the connection pipe 147 and arrives in the space 145 between the outer contour of the connection pipe 147 and the inner contour of the heat exchange finger 143. In the space 145, the hydrogen flows back into the direction which is opposite to the direction in which the hydrogen flows in the connection pipe 147. From the space 145, the hydrogen arrives in the second partial space 142 in order to leave the latter through one or several outlet pipes 15b. From there, the hydrogen arrives by way of the pipe 15b in the cooling channels 16. According to the prior art, several cooling channels 16 can be arranged such that the hydrogen flows in the combustion chamber wall 17 in a counterflow process, that is, in the opposite direction with respect to the combustible gases.

The warm hydrogen supplied to the heat exchanger 100 by way of the second inlet pipe 107 arrives in the second heat exchanger space 111 which, in turn, may be formed of several partial spaces. In the embodiment according to FIG. 3, the second heat exchanger space 111 comprises only one space 152.

From the space 152, the warm hydrogen arrives at the injection elements 33. For this purpose, the connection pipes 153 are provided which lead from the space 152 to the injection elements 33. The connection pipes 153 can change directly into the respective injection element 33. Also, in an arrangement according to FIG. 3, the connection pipe 153 can project through the two partial spaces 141, 142 of the first heat exchanger space 103 as well as the oxygen space 151.

The liquid oxygen from the pump 29 enters by way of the pipe 34 into the space 151. With approximately 100 K, its temperature is higher than that of the cold hydrogen in space 103, which measures approximately 45 K. Warm currents 161, 162 and 167 therefore flow from the warmer oxygen in space 151 onto the colder hydrogen in space 103 or the partial spaces 141 and 142 as well as through the walls of the tubes 147 with optionally arranged heat exchange ribs onto the hydrogen guided there.

The partial spaces 141, 142 as well as 151, 152 illustrated in FIG. 3 can partially also have a rotationally symmetrical design. Furthermore, the connection pipes 147, 153 may also be provided with heat exchange ribs 147a and 153a respectively. Such heat exchange ribs may also be provided at other points of the heat exchanger 100. The heat exchange ribs 147a are preferably arranged in the area of the oxygen space 151, while the heat exchange ribs 153a are preferably arranged in the area of the first partial space 141 of the first exchanger space 103.

The oxygen space 151 is preferably situated between the first partial space 141 and the second partial space 142 of the first heat exchanger 103. In this case, their contour surfaces are arranged such with respect to one another that a heat transfer 161 takes place from the first oxygen space 151 to the first partial space 141. Furthermore, a heat transfer 162 takes place from the oxygen space 151 into the interior of the connection pipe 147 which is connected with the interior of the first partial space 141.

Also, in the arrangement according to FIG. 3, a heat transfer 165 takes place from the second heat exchanger space 111 to the first partial space 141 of the first heat exchanger space 103. In addition, from the interior of the pipe 153, a heat transfer 166 takes place to the first partial space 141.

Furthermore, a heat transfer 167 takes place from the oxygen space 151 to the second partial space 142 of the first heat exchange space 103. In the arrangement of FIG. 3, on the one hand, a heat transfer 168 takes place from the combustion chamber 19 in the direction of the interior of the partial space 142 and a heat transfer 169 to the space 145 of the heat exchange fingers 143, as well as a heat transfer 170 through the combustion chamber wall to the hydrogen in the cooling channels 16.

The heat exchanger 100 according to the embodiment illustrated in FIG. 3 therefore permits a heating-up of the fuel coming by way of the pipe 15 and the first inlet pipe 101 from the hydrogen pump 12 on the basis of the heat transfers 161, 162, 168, 169 in the first heat exchanger space 103, from where the fuel arrives at the cooling channels 16. Therefore, when entering into the cooling channels 16, the fuel has a higher temperature than in the prior art. The fuel therefore leaves the cooling channels 16 by way of the pipe 23 also at a higher temperature than in the state of the art, so that more energy is available for operating the consuming devices of the device for supplying fuel. As a result, a higher combustion chamber pressure can be achieved which permits a better specific impetus.

The invention was described for a rocket propulsion unit using the two fuels hydrogen and oxygen. However, the invention can also be used generally for a first and a second fuel and even for additional fuels. It is only important that the fuel provided for driving the turbines, as a result of the heat exchange with the fuels, which are injected directly, is heated up higher and thus permits a higher turbine output, a higher pump pressure and thus a higher combustion chamber pressure.

What is claimed is:

1. A device for supplying fuel for a rocket propulsion unit having a first fuel circuit with a first fuel and at least a second fuel circuit with a second fuel, each fuel being brought to an increased energy level by a pump and being supplied for combustion over an injection head with injection elements, the first fuel being heated in cooling channels extending in a propulsion chamber wall before the fuel is supplied for combustion, and the first fuel subsequently being fed to at least turbines assigned to the pumps, wherein a heat exchanger is provided in which fuel coming from the turbines is in a heat exchange with fuel coming from a pump, wherein the heat exchanger is one of arranged on the injection head and integrated as a unit with the injection head, wherein the heat exchanger comprises a first, a second and a third inlet pipe as well as a first and at least a second outlet pipe, the first inlet pipe leading into a first heat exchanger space which in a heat-conducting manner is connected with a second heat exchanger space, fuel arriving from the first heat exchanger space by way of the first outlet pipe arriving at the cooling channels and fuel arriving by way of the second inlet pipe in the second heat exchanger space being connected with the injection head at least by way of the second outlet pipe, and wherein the first heat exchanger space is connected with at least one heat exchange finger which projects at least partially into a combustion chamber and whose discharge is connected with the first outlet pipe.

2. A device according to claim 1, wherein the first heat exchanger space is formed by a first partial space and a second partial space which are connected by way of a connection pipe, the second heat exchanger space being connected by way of connection pipes with the combustion chamber, and a third heat exchanger space being situated in an area between the first partial space and the second partial space of the first heat exchanger space and being connected by way of connection pipes with the combustion chamber.

3. A device according to claim 2, wherein the second fuel is fed to the third heat exchanger space and the first fuel is introduced into the second heat exchanger space from an area which, viewed in a flow direction, is situated behind a last turbine.

4. A device according to claim 1, wherein said fuels are hydrogen and oxygen.

5. A device for supplying fuel for a rocket propulsion unit having a first fuel circuit with a first fuel and at least a second fuel circuit with a second fuel, each fuel being brought to an increased energy level by a pump and being supplied for combustion over an injection head with injection elements, the first fuel being heated in cooling channels extending in a propulsion chamber wall before the fuel is supplied for combustion, and the first fuel subsequently being fed to at least turbines assigned to the pumps, wherein a heat exchanger is provided in which fuel coming from the turbines is in a heat exchange with fuel coming from a pump, wherein the heat exchanger is one of arranged on the injection head and integrated as a unit with the injection head, wherein the heat exchanger comprises a first, a second and a third inlet pipe as well as a first and at least a second outlet pipe, the first inlet pipe leading into a first heat exchanger space which in a heat-conducting manner is connected with a second heat exchanger space, fuel arriving from the first heat exchanger space by way of the first outlet pipe arriving at the cooling channels and fuel arriving by way of the second inlet pipe in the second heat exchanger space being connected with the injection head at least by way of the second outlet pipe, and wherein the first heat exchanger space is formed by a first partial space and a second partial space which are connected by way of a connection pipe, the second heat exchanger space being connected by way of connection pipes with a combustion chamber, and a third heat exchanger space being situated in an area between the first partial space and the second partial space of the first heat exchanger space and being connected by way of connection pipes with the combustion chamber.

6. A device according to claim 5, wherein the second fuel is fed to the third heat exchanger space and the first fuel is introduced into the second heat exchanger space from an area which, viewed in a flow direction, is situated behind a last turbine.

7. A heat exchanger for a rocket propulsion unit having:

a combustion space bounded by propulsion chamber walls, cooling channels in said chamber walls, an injection head, a first fuel circuit for supplying a first fuel to the injection head, a second fuel circuit for supplying a second fuel to the injection head, wherein said fuel circuits include pumps driven by turbines, wherein said first fuel in said first fuel circuit is heated by the cooling channels and fed to the turbines before being supplied to the injection head, said heat exchanger being operable to exchange heat between fuel from the turbines and fuel from a pump, said heat exchanger comprising:

a first, a second and a third inlet pipe as well as a first and at least a second outlet pipe, the first inlet pipe leading into a first heat exchanger space which in a heat-conducting manner is connected with a second heat exchanger space, fuel arriving from the first heat exchanger space by way of the first outlet pipe arriving at the cooling channels and fuel arriving by way of the second inlet pipe in the second heat exchanger space being connected with the injection head at least by way of the second outlet pipe, wherein the first heat exchanger space is connected with at least one heat exchange finger which projects at least partially into a combustion chamber and whose discharge is connected with the first outlet pipe.

8. A heat exchanger for a rocket propulsion unit having:

a combustion space bounded by propulsion chamber walls, cooling channels in said chamber walls, an injection head, a first fuel circuit for supplying a first fuel to the injection head, a second fuel circuit for supplying a second fuel to the injection head, wherein said fuel circuits include pumps driven by turbines, wherein said first fuel in said first fuel circuit is heated by the cooling channels and fed to the turbines before being supplied to the injection head, said heat exchanger being operable to exchange heat between fuel from the turbines and fuel from a pump, said heat exchanger comprising:

a first, a second and a third inlet pipe as well as a first and at least a second outlet pipe, the first inlet pipe leading into a first heat exchanger space which in a heat-conducting manner is connected with a second heat exchanger space, fuel arriving from the first heat exchanger space by way of the first outlet pipe arriving at the cooling channels and fuel arriving by way of the second inlet pipe in the second heat exchanger space being connected with the injection head at least by way of the second outlet pipe, wherein the first heat exchanger space is formed by a first partial space and a second partial space which are connected by way of a connection pipe, the second heat exchanger space being connected by way of connection pipes with a combustion chamber, and a third heat exchanger space being situated in an area between the first partial space and the second partial space of the first heat exchanger space and being connected by way of connection pipes with the combustion chamber.

9. The heat exchanger according to claim 8, wherein the second fuel is fed to the third heat exchanger space and the first fuel is introduced into the second heat exchanger space from an area which, viewed in a flow direction, is situated behind a last turbine.

* * * * *